April 21, 1925.  
T. M. ROGERS ET AL  
1,534,414  
FISHING TOOL  
Filed Nov. 5, 1923
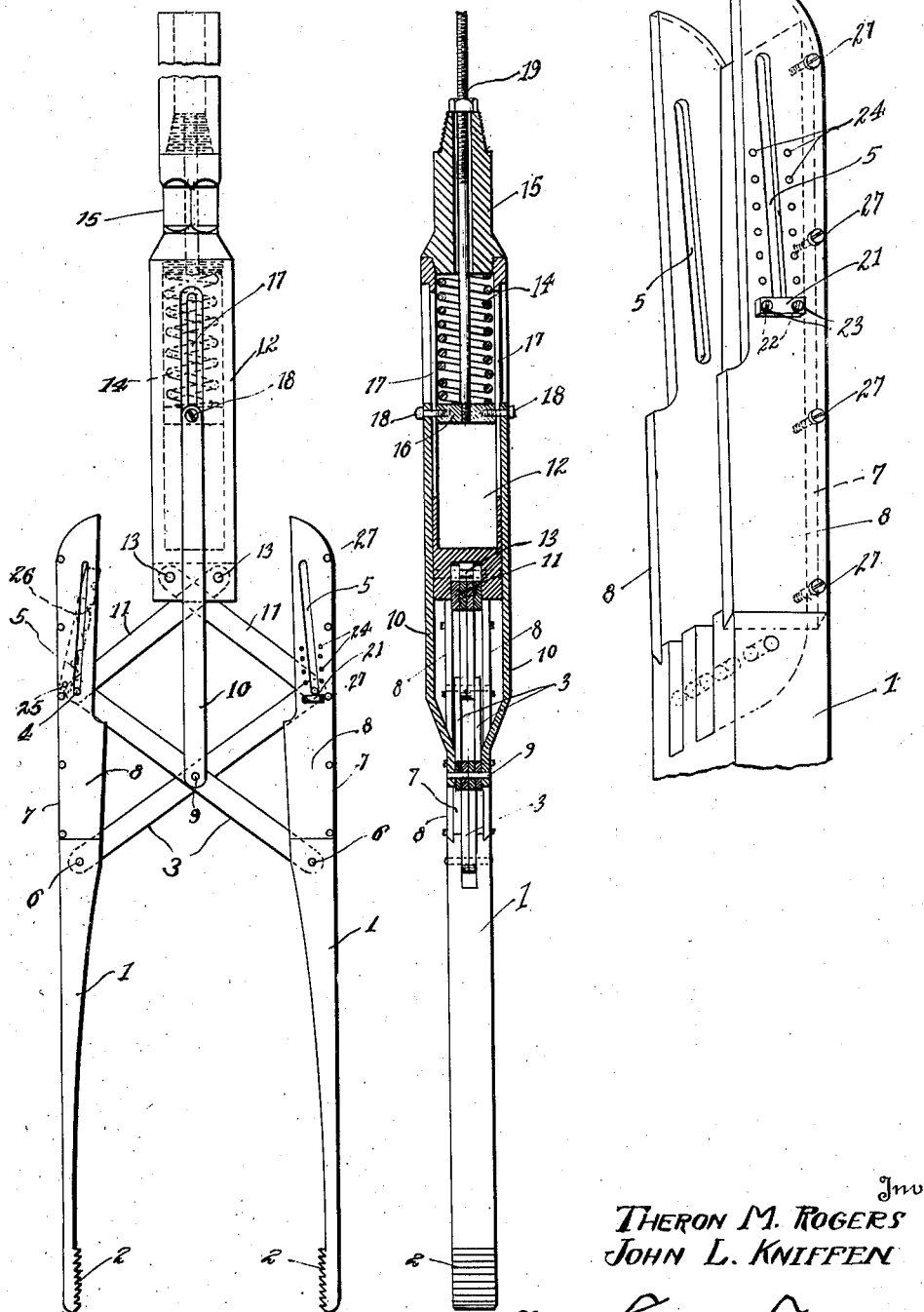
Inventors  
THERON M. ROGERS  
JOHN L. KNIFFEN  
By Lyon & Lyon  
Attorney Patented Apr. 21, 1925.

1,534,414

UNITED STATES PATENT OFFICE.

THERON M. ROGERS AND JOHN L. KNIFFEN, OF FELLOWS, CALIFORNIA.

FISHING TOOL.

Application filed November 5, 1923. Serial No. 672,764.

*To all whom it may concern:*

Be it known that we, THERON M. ROGERS and JOHN L. KNIFFEN, citizens of the United States, both residing at Fellows, in the county of Kern, State of California, have invented a new and useful Fishing Tool, of which the following is a specification.

This invention relates to fishing tools for use in the construction and operation of wells such as oil wells.

An object of this invention is to provide a fishing tool for removing from an oil well broken pieces of drilling tools or other devices lodged in the well which fishing tool can be employed with great ease and assurance of engaging the object to be removed from the well.

An object of the invention is to provide a fishing tool with opposed gripper members which open and close around the object to be withdrawn from the well and which gripper members can be passed over the sides of the object to be removed, irrespective of the shape or position of such object.

Another object of the invention is to provide a fishing tool with two substantially vertical gripper members which can be opened and closed while the members are retained in the vertical position.

Another object of the invention being to provide a means for varying the maximum opening of the fishing tool so that the maximum opening of the fishing tool can be regulated for each size well hole or casing the fishing tool is to be sent through, so that there is no danger of expanding the fishing tool below the well casing to such a size that when the object to be removed is gripped by the fishing tool, it is impossible then to remove the fishing tool from the well hole.

With these ends in view the invention includes certain novel parts, relation and combination of which parts will be apparent from the description of the accompanying drawings, wherein there is illustrated an example of a preferred embodiment of the invention and additional objects and advantages of the invention will be apparent both from the description of said device and through the use of practice of the invention.

Figure 1 is an elevation of the fishing tool embodying the invention, with the operating rod removed.

Fig. 2 is an elevation at right angles to Figure 1, partially in vertical section, with the operating rod in place, and Fig. 3 is an enlarged perspective view of the upper end of one of the gripper members.

In the drawings, the fishing tool is illustrated as comprising two opposed gripper members 1 which lie or extend substantially in a vertical direction or plane and are preferably provided at their lower ends with teeth 2, the teeth of each gripper member 1 facing the opposed gripper member so that the gripper member 1 may enclose around the object to be removed from the well and the same will be held firmly in the fishing tool by the teeth 2. At the medial section of each gripper arm 1 is pivoted by a pin 6 a cross member or link 3 which cross member or link 3 extends over to the opposed gripper member 1 and is there provided with a pin 4 at its end. Each pin has a sliding engagement with a slot 5 in one of the opposed gripper members. Preferably above the pins 6 the gripper members 1 are formed with an outer side wall 7, from which extend opposed side plates 8. The opposed end of the pins 4 are thus slidable in opposed slots 5 in these opposed side plates 8.

The cross members 3 are pivotally connected at their medial portions to a pin 9 which, in turn, is connected to opposed vertical extending control rods 10. In the preferred embodiment of the invention from each pin 6 there are attached two complementary pivoted arms 3 extending one back of the other when viewed as in Figure 1, each of which is of equal length and attached to the sliding pins 4. The slots 5 in which the sliding pins 4 slide are preferably angled slightly inwardly in the upward direction as by this construction the opposed gripper arms 1 may be more nearly retained in the vertical position throughout their opening and closing. From each sliding pin 4 extends a supporting link 11, said links being joined to the lower end of a body 12 of the fishing tool. The supporting links preferably cross each other near the body 12 and are pivoted to spaced apart pins 13 at the lower end of the body 12.

The body 12 of the device encloses a coil spring 14 which seats against a coupling 15 screw threaded into the upper end of the body 12, said spring 14 pressing against a head 16 attached to the upper ends of the vertically extending well rods 10. The spring 14 thus normally urges said rod 10 in a downward direction. In this manner the inherent tension of the coil spring 14 is applied to the pin 9, urging the same downward and through resultant stress in the cross members 3 and supporting links 11, the spring 14 continually urges the gripper members 1 into the closed position, so that there is provided means for normally urging the gripper members into the gripping or closed position.

To secure the control rods 10 to the head 16, I prefer to provide slots 17 in opposed side walls of the body 12 and pins 18 secured to the head 16 and extending through the opposed slots 17. To said pins 18 are secured the upper end of the control rods 10. As shown in Figure 2, there is provided an operating rod 19 screwed into the head 16 and extending vertically upward through the fishing tool and enclosed by the coiled spring 14. The operating rod 19 extends above the coupling 15 and is there provided with a nut 20. The operating rod 19 provides a means for setting the opposed gripper members 1, in the open position. By turning the nut 20 to move the rod upward, the opposed members 1 are moved to the open position.

To provide a means for limiting the opening of the opposed gripper arms 1, I provide an adjustable stop 21 along the slots 5 of the gripper members, said adjustable stop 21 is provided with openings 22 at its opposed ends through which bolts or pins 23 may be passed and fit in any one of a series of opposed bolt holes 24 placed along one of the slots 5. By changing the position of the stop 21 the maximum opening of the gripper arms may be readily varied and in this manner the fishing tool may be employed for fishing below different sizes of well casings without any danger of the fishing tool being so expanded that it cannot be removed back through the well casing.

To set the fishing tool in the open position, I provide a catch 25 pivoted to one of the gripper members 1 and having a plurality of notches 26. Said catch 25 may be pivoted into engagement with one of the pins 4 which slide in the slots 5 and prevent the closing of the gripper members 2, the force of the spring 14 being relied upon to hold the pin 4 into one of the notches 26.

I have also provided a construction of the gripper members 1 whereby the lower section of the gripper arms may be removed from the upper section to the end that various forms of the gripper arms may be applied to the same fishing device. For this purpose the opposed plates 8 are preferably constructed separate from the remainder of the gripper members 1 and secured to the end plate 7 by screws or studs 27.

In operation the device may be either first set in the maximum position in which the gripper arms are to assume and locked in said position by the catch 25 or the opening of the gripper arms may be manipulated from the surface of the well. To open the gripper members from the top of the well, it is necessary to lower the fishing tool to the bottom of well where a further downward pressure will cause the grippers to open. The fishing tool is lowered into the well and the gripper arms 1 being parallel and vertically disposed will pass around all objects lodged in the hole.

If the catch 25 is employed to hold the jaw open a slight jar will release the pin 4 from the catch 25 and the tension of the coil spring 14 will then close the gripper members 1 about the object to be removed. The fishing tool is then raised back through the well hole and during this raising of the fishing tool an additional force tending to maintain the gripper members closed is applied through the control rods 11 as the weight of the device engaged by the gripper arms will be supported on said rods 11. By crossing the rods near the pins 13 by which they are attached to the body a considerable force can be applied to the lengths 11 even when the gripper members 1 are near the closed position and engaging a relatively small object.

While the fishing tool herein described is well suited for the purposes of this invention, it is not intended to limit the invention to the specific construction or details of parts herein described, as various modifications may be made in the device illustrated without departing from the spirit of the invention.

This invention is of the scope set forth in the accompanying claims:

We claim:

1. A fishing tool adapted to be lowered down a well hole for recovering lost parts therein, comprising opposed gripper members, said members extending in substantially a vertical direction, and means operative from the top of the well for opening and closing said gripper members while maintaining the same substantially vertical.

2. A fishing tool adapted to be lowered down a well hole to recover lost parts therein comprising opposed gripper members, said members extending in substantially a vertical direction, means operative from the top of the well for opening and closing said gripper members while maintaining the same substantially vertical, and means for varying the maximum opening between the gripper members.

3. A fishing tool adapted to be lowered down a well hole and operated therein for recovering lost parts, comprising opposed gripper bars, a cross member pivoted to each gripper member and having a sliding engagement with the opposed member, said cross members being pivotally connected together, and means operative from the top of the well for causing a relative movement between the members for opening and closing the opposed gripper members.

4. A fishing tool for recovering lost parts from a well hole, comprising opposed gripper members, said members extending in substantially a vertical direction, means operative from the top of the well when the tool is lowered therein for opening and closing said gripper members while maintaining the same extending in substantially vertical directions, means for varying the maximum opening permitted between the gripper members, and means for holding the gripper members in various open positions.

5. A fishing tool comprising opposed gripper bars, cross members pivoted to each gripper bar and having a sliding engagement with the opposed gripper member, said cross members being pivotedly connected together, and spring means acting through the pivot connection between the cross members for normally applying tension to urge the gripper members to the closed position.

6. A fishing tool comprising opposed gripping members extending in substantially parallel directions and in vertical planes, means for opening and closing said gripper members while maintaing the same parallel and vertical, said means including a spring normally urging the gripper bars into the closed position and means actuated by an upward pull from the top of the well to open the gripper members.

7. A fishing tool comprising a body, supporting links connected to the lower end of the body and crossing one over the other, said links being connected at their opposed ends to pins each having a sliding engagement with a gripper member, gripper members engaging the pins, cross members pivoted to said pins, crossing each other and each pivoted at its other end to the opposed gripper member, a pivot connection between the crossing members at their intersection, and means actuated through the pivot connection between the cross over members for opening and closing said gripper members.

8. In a device of the class described, a pair of opposed gripper members, means yieldingly urging the gripper members into the closed position, and means pressing the gripping members together when a load is applied to the gripper members.

9. A device of the class described, comprising opposed gripper members, said members extending substantially in vertical directions, means for opening and closing said gripper members while maintaining the same in substantially the vertical directions, and means for detaching the lower end of the gripper members from the device.

Signed at Fellows, California this 19th day of October 1923.

THERON M. ROGERS.
JOHN L. KNIFFEN.